(No Model.)  2 Sheets—Sheet 2.
C. B. HATFIELD.
LAST GRADUATOR.
No. 581,721. Patented May 4, 1897.
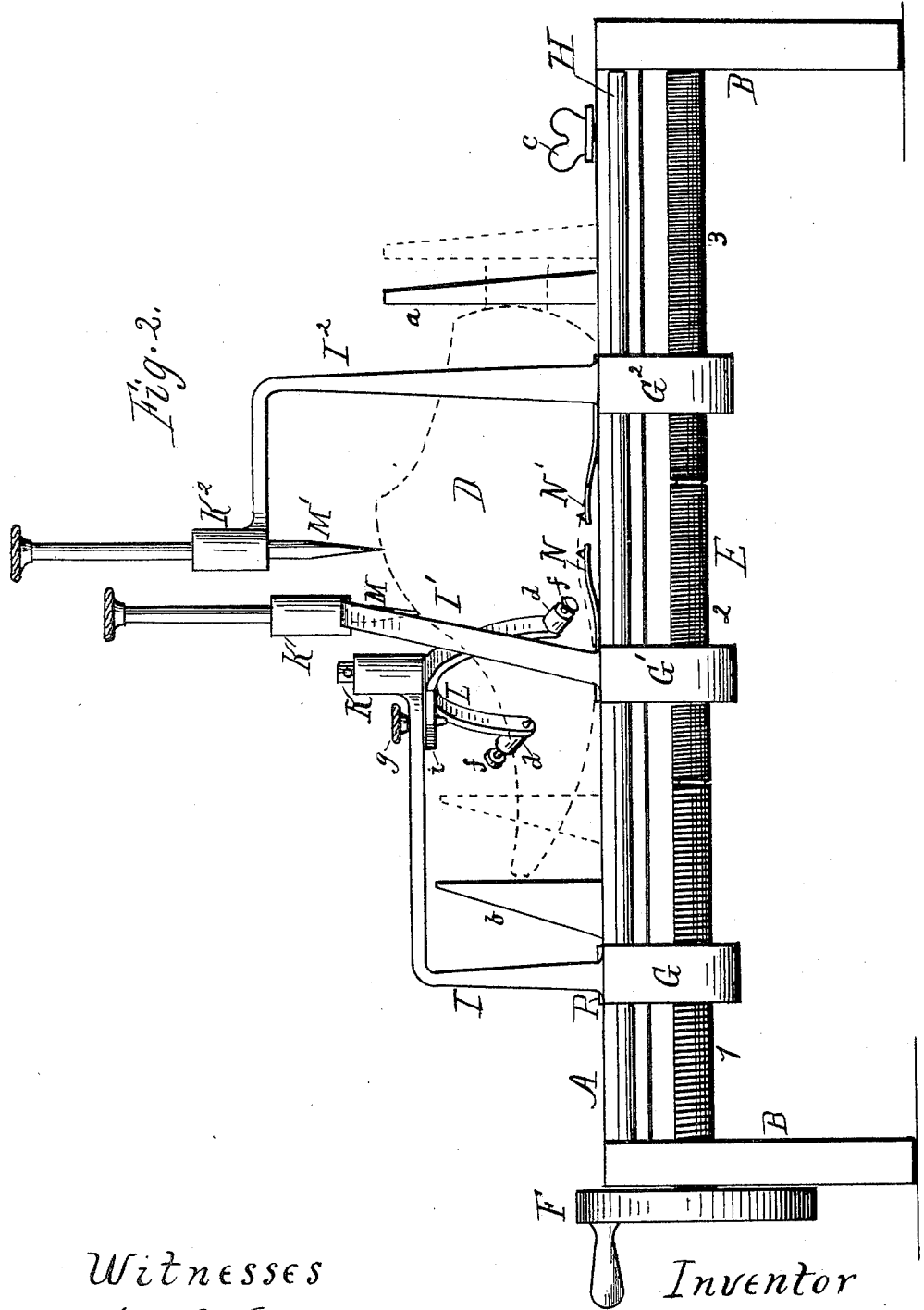
Witnesses
Chas. R. Osgood
M. W. Patch
Inventor
Chas. B. Hatfield.
per R. F. Osgood.
Atty

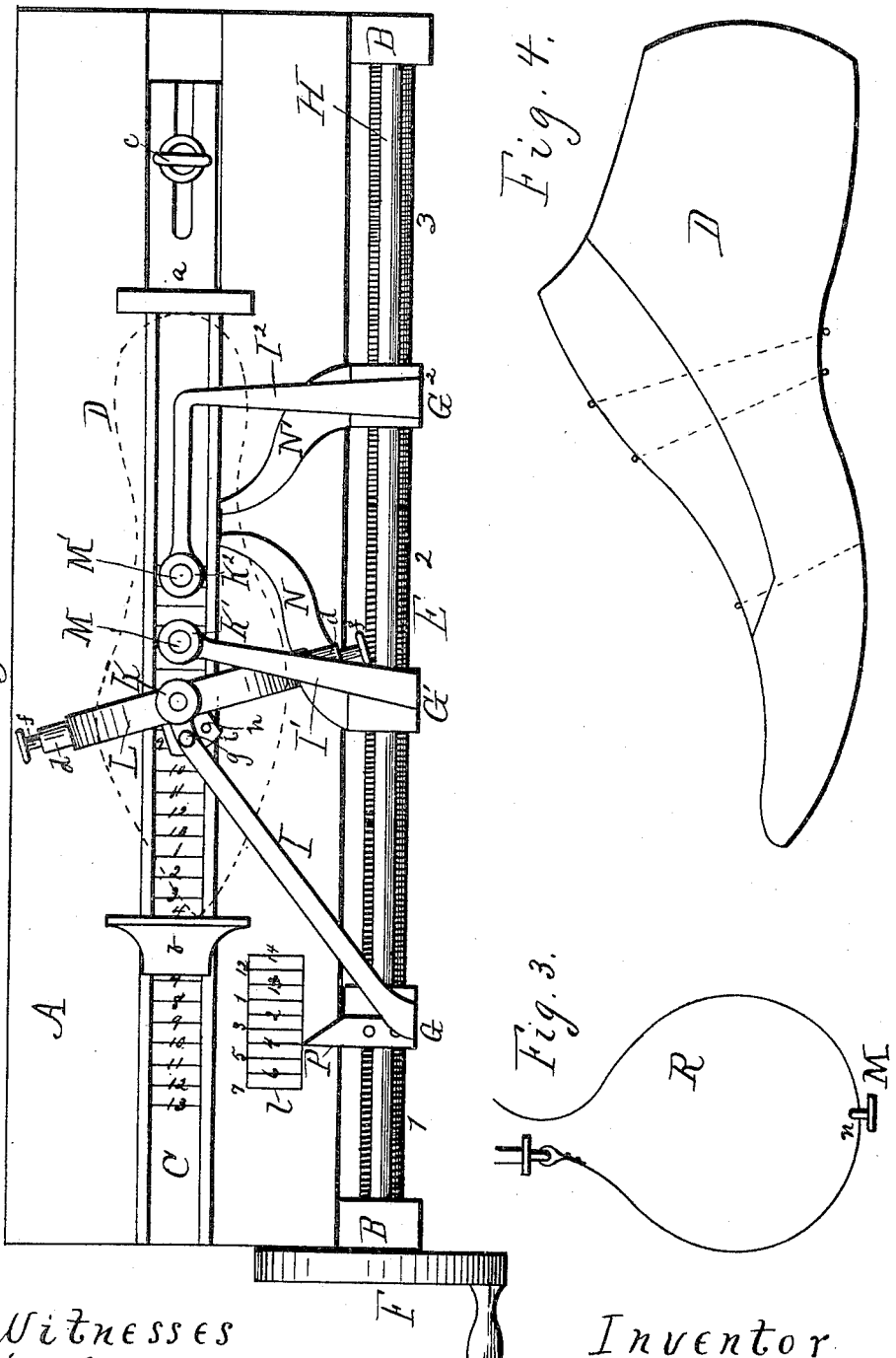

UNITED STATES PATENT OFFICE.

CHARLES B. HATFIELD, OF ROCHESTER, NEW YORK.

LAST-GRADUATOR.

SPECIFICATION forming part of Letters Patent No. 581,721, dated May 4, 1897.

Application filed September 21, 1896. Serial No. 606,473. (No model.)

*To all whom it may concern:*

Be it known that I, CHARLES B. HATFIELD, of Rochester, in the county of Monroe and State of New York, have invented a certain new and useful Improvement in Last-Graduators; and I do hereby declare that the following is a full, clear, and exact description of the same, reference being had to the drawings accompanying this application.
Lasts are made in regularly increasing and decreasing sizes, varying in America one-third of an inch in length and one-fourth of an inch in girth. The girth measurements are taken in different positions called "ball," "waist," and "instep," the ball measurement being made diagonally from side to side and the instep measurement being in an inclined line vertically.

The sizes commence with infants' size No. 1—four and one-fourth inches in length—running to No. 13, each size varying one-third of an inch, a new size then commencing again at No. 1 and running as high as may be desired. They are also graded in width, generally designated as "AA," "A," "B," "C," "D," "E," and "EE," the narrowest width being "AA" and the widest "EE." The widths vary one-fourth of an inch in the various sizes above designated, while the lengths are the same in all. The human foot is supposed to average the same general measurements.

The measurements of lengths of lasts have heretofore been made by the use of a so-called "shoemaker's size-stick," but the different points of girth measurement have been located longitudinally on the last—such as ball, waist, and instep—by the eye alone, and each individual eye would perhaps locate the points in radically different positions, and inaccurate location of those points would result in inaccurate girth measurements. Furthermore, there has been no way whereby one person could measure the foot at certain definite points and another person could measure a last to correspond.

It is the object of my invention to remedy these difficulties by the use of mechanism which will always positively locate the points for taking girth measurements in exact relative positions with their length, in sizes of lasts or feet, and also in the different recognized widths of lasts or feet.

By the use of this mechanism all so-called "misfits" in boots and shoes may be prevented.

The invention consists in the combination and arrangement of parts hereinafter described and claimed.

In the drawings, Figure 1 is a plan view of the machine. Fig. 2 is a side elevation. Fig. 3 is a diagram showing a side view of the tape measuring device. Fig. 4 is a side elevation of a last with the points of girth measurement located thereon.

A indicates a table or bed supported by legs B B. On top of this table is located a fixed scale or size-stick C, provided with movable head and tail blocks $a\ b$, between which the last D or foot is placed. The scale is graduated by numerals indicating the different sizes of lengths of lasts or feet, and the tail-block $b$ is adjustable thereon to accommodate such different lengths. The head-block $a$ is also adjustable forward and back and held in any position by a clamping-screw $c$, the object of which is to allow a last, with the bearing hub or stub by which it is turned in the last-lathe, to be inserted at any time.

E is a differential screw extending longitudinally of the machine and turned by a crankwheel F or by other means. This screw is divided into sections of 1 2 3, more or less, of threads of different gages or leads, or may be different screws, section 1 being the coarsest, section 2 of less grade, and so on to the number of sections used.

G G' G² are nuts resting, respectively, on the thread-sections and movable thereby as the screw is rotated. The nuts are held against turning by a guide-rod H or any other suitable means.

I I' I² are arms attached to the nuts, extending inward, and provided with sockets or bearings K K' K², as shown. To the socket K is pivoted a yoke L, which is adapted to swing right or left to a limited degree, its lower ends embracing the ball of the foot or last, and provided at said ends with bearings $d\ d$, through which pass devices $f\ f$, which I denominate "measuring-position locators," that contact with the opposite sides of the ball at proper points. As these points of the ball are not exactly opposite, but stand diagonally one in advance of the other, the yoke stands in an inclined direction, as shown in Fig. 1. In this position it fits the ball of a "left" last or foot. To adapt it to a "right" last or foot, it is simply swung in the opposite direction. It is held in either position by a pin $g$, which passes through a hole in the yoke and either of two holes $h\,h$, made in a flange $i$, forming a part of the yoke, or it may be adjusted and held in any other suitable manner.

To the arms $I'\,I^2$ are attached the sockets $K'\,K^2$, in which rest measuring-position locators M M', having free sliding movement and resting, respectively, over the waist and instep points of the last or foot where the girth measurements are made. By means of these locators the points of measurement are located longitudinally on the top of the last or foot.

To the nuts $G'\,G^2$ are attached measuring-position locators N N', extending under the last or foot and serving to locate the points of measurement on the bottom of the last or foot. To the nut G is also attached a pointer P, which registers with a scale $l$, marked with numerals "1," "2," "3," up to and including "13," then commencing again with "1" up to "14," as sizes of lasts and feet run, which indicate the different sizes of lasts.

In locating the points of measurement on a last or foot it is designed that the locators $f\,f$ shall touch the widest part of the ball and that the markers M M' shall be located directly above and in line with what is known in the trade as the "waist" and "instep" measurements. At the same time the bottom locators N N' locate the points on the bottom of the last or foot. With these locators visible marks can be made on the last or foot, after which the measurements can be made around the last or foot at these points, as indicated by the dotted lines in Fig. 4. If desired, measuring-tapes R may be attached to the locators for extending around the last or foot, as shown in Fig. 3. In such case the tape is attached to one locator and passed through a loop $n$ of another. Such tapes may or may not be used. The measurements may be made separately after the locators have marked the points of measurement.

To shift from one size of last or foot to another, the new size is inserted in place over the center scale, and at the same time the screw E is rotated until the pointer P registers with the same size-number required on the scale $l$. This screw by moving the nuts brings the several locators all in proportional places to locate the points of measurement on the new size of last or foot. For instance, if the size is No. 4, as shown in the drawings, the screw is turned until the pointer P registers with "4" on the scale $l$. This brings the locators all in position for measuring that size of last or foot. By this means all the different sizes of lasts or feet can be marked or measured at the proper points of girth measurement with the greatest degree of accuracy and avoiding the imperfections in measurement which occur from guessing at the point, as is now done in measuring by the eye.

By the use of this invention exact measurements can be made of the human foot and a last can be fashioned therefor exactly fitted thereto, the last having its points of measurement located either in the same machine or a duplicate of the same. In this manner a foot measurement can be made at one locality and the last fitted at another, no matter how remote, with certainty that it will be correct. This machine locates the points of measurement on a stationary last or foot, and therefore differs from those conformators in which the last is mounted in bearings and receives rotary motion, as the foot cannot be rotated.

I do not wish to limit myself to the identical construction above described. In place of the screw or screws other devices may be used for adjusting the locators to positions to suit different-sized lasts or feet. The form of the locators may also be varied. The design is to so combine the parts that at every change of size of the last or foot the locators will be correspondingly changed to the points of measurement in proper positions longitudinally of the last or foot.

I am aware that devices are known which show a method of measuring a last at different points, but the construction is such that they are adapted to measure a last only and not a foot. In some cases the last has been mounted so as to revolve; but it is apparent that such devices would not be applicable to locating the points of measurement on the human foot; neither can such revolving lasts have the measurements made on a diagonal or inclined line, but only on a line at right angles to the axis of rotation. There are also so-called "foot-conformators," but they are not constructed so as to grade the difference in sizes or widths of lasts or feet. My apparatus is such as to measure with equal facility lasts or feet and to grade the different measurements in sizes of lasts.

Having described my invention, what I claim as new, and desire to secure by Letters Patent, is—

1. In combination with a support for the last or foot, a set of measuring-position locators for indicating the points of measurement; holders with which said locators are connected; and means for differentially moving the holders forward and back to correspond with the points of girth measurements in different sizes of lasts or feet, as herein shown and described.

2. In combination with a support for the last or foot, a set of measuring-position locators capable of forward-and-back movement; a set of holders with which the locators are connected; a corresponding set of carriers to which the holders are attached; and means for differentially moving the parts forward and back to correspond with different sizes of lasts or feet, as specified.

3. In combination with a support for the last or foot, a set of measuring-position locators; a set of holders with which the locators are connected; a set of carriers to which the holders are attached; and a screw or screws made in sections of different leads for differentially imparting motion to the parts forward or back, to correspond with different sizes of lasts or feet, as specified.

4. In combination with a suitable support, a scale mounted thereon for receiving the last or foot and indicating its length; a screw or screws in sections of graded leads; nuts on the several sections of the screw or screws, and receiving motion therefrom; arms attached to the nuts; and measuring-position locators connected with the arms, adapted to locate the points of measurement on the last or foot; as herein shown and described.

5. The combination, with a suitable support, of a scale mounted thereon for receiving the last or foot and indicating its length; a screw or screws in sections of graded leads; nuts on the several sections of the screw or screws and receiving motion therefrom; arms attached to the nuts extending over the last or foot, measuring-position locators connected with the arms adapted to mark the points of measurement on the last or foot; and a pointer connected with one of the nuts operating in connection with the scale for indicating the length of the last or foot; as herein shown and described.

6. In combination with a support on which the last or foot is placed, of a yoke pivoted above the last or foot, capable of being shifted to reverse inclined positions; and measuring-locators attached to the ends of the yoke for marking the ball on opposite sides, as specified.

In witness whereof I have hereunto signed my name in the presence of two subscribing witnesses.

CHARLES B. HATFIELD.

Witnesses:
  R. F. OSGOOD,
  B. M. WING.